United States Patent
Chattopadhyay et al.

(10) Patent No.: US 6,966,990 B2
(45) Date of Patent: *Nov. 22, 2005

(54) COMPOSITE PARTICLES AND METHOD FOR PREPARING

(75) Inventors: Pratibhash Chattopadhyay, North Royalton, OH (US); Boris Y. Shekunov, Aurora, OH (US); Jeffrey S. Seitzinger, Broadview Heights, OH (US); Robert W. Huff, North Royalton, OH (US)

(73) Assignee: Ferro Corporation, Cleveland, OH (US)

( * ) Notice: Subject to any disclaimer, the term of this patent is extended or adjusted under 35 U.S.C. 154(b) by 109 days.

This patent is subject to a terminal disclaimer.

(21) Appl. No.: 10/441,137

(22) Filed: May 19, 2003

(65) Prior Publication Data

US 2004/0071781 A1 Apr. 15, 2004

Related U.S. Application Data

(60) Provisional application No. 60/417,941, filed on Oct. 11, 2002, and provisional application No. 60/445,944, filed on Feb. 7, 2003.

(51) Int. Cl.$^7$ ............................................. B01D 11/02
(52) U.S. Cl. ........................... 210/634; 210/639; 264/5; 264/7; 264/11; 239/10; 424/489; 424/490; 516/53; 516/54
(58) Field of Search ................................. 210/511, 634, 210/638, 639, 644; 241/38; 264/4, 4.1, 4.33, 5–12; 239/9, 10; 424/450, 451, 489, 490, 491, 501; 516/53, 113, 135, 922, 923, 54, 55

(56) References Cited

U.S. PATENT DOCUMENTS

| 4,177,177 A | 12/1979 | Vanderhoff et al. |
| 4,744,926 A | 5/1988 | Rice |
| 4,898,673 A | 2/1990 | Rice et al. |
| 5,158,704 A | 10/1992 | Fulton et al. |

(Continued)

FOREIGN PATENT DOCUMENTS

JP 01-158042J P 6/1989

OTHER PUBLICATIONS

Sjostrom, Brita and Bergenstahl, Bjorn. Preparation of submicron drug particles in lecithin-stabilized o/w emulsions; I. Model studies of the precipitation of cholesteryl acetate, International Journal of Pharmaceutics 88, 53–62 (1992) Elsevier Science Publishers B V.

(Continued)

*Primary Examiner*—Joseph Drodge
(74) *Attorney, Agent, or Firm*—Rankin, Hill, Porter & Clark LLP

(57) ABSTRACT

A method for producing composite particles using a supercritical fluid extraction technique on an emulsion. First and second materials (for example; a polymer and a biologically active material) are dissolved or suspended in a preferably solvent to form a solution or dispersion. The solution or dispersion is emulsified in a polar solvent to form an oil-in-water or water-in-oil-in-water emulsion. The emulsion is contacted with a supercritical fluid to extract the solvent. Removal of the solvent by the supercritical fluid from the emulsion supersaturates at least the first material in the solution causing the first material to precipitate out of the solution as composite particles that include both the first and second materials.

51 Claims, 12 Drawing Sheets

U.S. PATENT DOCUMENTS

| | | |
|---|---|---|
| 5,189,107 A | 2/1993 | Kasai et al. |
| 5,216,065 A | 6/1993 | Colyer et al. |
| 5,244,768 A | 9/1993 | Inaba |
| 5,266,205 A | 11/1993 | Fulton et al. |
| 5,296,166 A | 3/1994 | Leong |
| 5,424,076 A * | 6/1995 | Gorissen et al. ............ 424/501 |
| 5,494,683 A | 2/1996 | Liversidge et al. |
| 5,554,382 A | 9/1996 | Castor |
| 5,578,650 A | 11/1996 | Delgado et al. |
| 5,622,649 A | 4/1997 | Hunter et al. |
| 5,639,441 A | 6/1997 | Sievers et al. |
| 5,674,911 A | 10/1997 | Emanuele et al. |
| 5,691,387 A | 11/1997 | Emanuele et al. |
| 5,696,298 A | 12/1997 | Emanuele et al. |
| 5,727,333 A | 3/1998 | Folan |
| 5,750,679 A | 5/1998 | Haas et al. |
| 5,766,637 A | 6/1998 | Shine et al. |
| 5,776,486 A | 7/1998 | Castor et al. |
| 5,789,505 A | 8/1998 | Wilkinson et al. |
| 5,827,522 A | 10/1998 | Nowak |
| 5,863,696 A | 1/1999 | Koyama et al. |
| 5,921,478 A | 7/1999 | Kamiwano et al. |
| 5,981,474 A | 11/1999 | Manning et al. |
| 5,990,241 A | 11/1999 | Emanuele et al. |
| 5,993,850 A | 11/1999 | Sankaram et al. |
| RE36,665 E | 4/2000 | Emanuele et al. |
| 6,087,003 A | 7/2000 | Benoit et al. |
| 6,095,134 A | 8/2000 | Sievers et al. |
| 6,106,720 A | 8/2000 | Kanel et al. |
| 6,183,783 B1 * | 2/2001 | Benoit et al. ............... 424/490 |
| 6,214,384 B1 | 4/2001 | Pallado et al. |
| 6,228,399 B1 | 5/2001 | Parikh et al. |
| 6,235,701 B1 | 5/2001 | Senger Elsbernd et al. |
| 6,248,363 B1 | 6/2001 | Patel et al. |
| RE37,285 E | 7/2001 | Emanuele et al. |
| 6,291,013 B1 | 9/2001 | Gibson et al. |
| 6,299,906 B1 | 10/2001 | Bausch et al. |
| 6,359,014 B1 | 3/2002 | Emanuele et al. |
| 6,372,260 B1 | 4/2002 | Andersson et al. |
| 6,380,302 B1 | 4/2002 | Ikenaga et al. |
| 6,384,090 B2 | 5/2002 | Riede et al. |
| 6,391,452 B1 | 5/2002 | Antonsen et al. |
| 6,414,050 B1 | 7/2002 | Howdle et al. |
| 6,416,742 B1 | 7/2002 | Stefely et al. |
| 6,440,431 B1 | 8/2002 | Yoshida et al. |
| 6,440,493 B1 | 8/2002 | Gibson et al. |
| 6,479,584 B1 | 11/2002 | Nakagawa et al. |
| 6,540,393 B1 | 4/2003 | Lyons et al. |
| 6,669,960 B2 * | 12/2003 | Etter .......................... 424/489 |
| 6,761,909 B1 * | 7/2004 | Etter .......................... 424/489 |
| 6,858,199 B1 * | 2/2005 | Edwards et al. .............. 424/45 |
| 2004/0110871 A1 * | 6/2004 | Perrut et al. |

OTHER PUBLICATIONS

Sjostrom, Brita and Bergenstahl, Bjorn. Preparation of submicron drug particles in lecithin–stabilized o/w emulsions; I. Model studies of the precipitation of cholesteryl acetate, International Journal of Pharmaceutics 84, 107–116 (1992) Elsevier Science Publishers B V.

Yoshinobu, Kawano; Shiomori, Koichiro; Kiyoyama, Shiro; Takeshita, Koichiro; and Hatate, Yasuo. Characteristics of Biodegradable Microcapsules by Solvent Evaporation in (W/O/W) Emulsion System Journal of Chemical Engineering of Japan, vol. 34.

Nakajima, Akira; Hashimoto, Kazuhito; and Watanabe, Toshiya. Recent Studies on Super–Hydrophobic Films, Monatshefte fur Chemie 132, 31–41 (2001). Austria.

Chung, Tze–Wen; Huang, Yi–You; and Liu Yi–Ze. Effects of the rate of solvent evaporation on the characteristics of drug loaded PLLA and PDLLA microspheres, International Journal of Pharmaceutics, 212, 161–169 (2001).

* cited by examiner

COMPOSITE PARTICLES AND METHOD FOR PREPARING

REFERENCE TO RELATED APPLICATIONS

This application claims priority to provisional patent application Ser. No. 60/417,941, filed Oct. 11, 2002 and No. 60/445,944, filed Feb. 7, 2003, the disclosures of which are hereby incorporated by reference in their entirety.

BACKGROUND OF THE INVENTION

1. Field of the Invention

The present invention relates generally to a method of producing composite particles, and specifically to a method of producing composite particles comprising a polymer and a biologically active material via supercritical fluid processing.

2. Description of Related Art

Conventional methods of preparing composite or single material polymer particles include spray drying, and jet milling. Further, particles have been produced from emulsions using techniques such as emulsion polymerization, emulsion evaporation, and solvent extraction of emulsions. Typical spray drying techniques involve evaporation of a solvent containing the polymer using hot air. The high temperatures employed for such processing can sometimes degrade thermally labile drugs and polymers. Furthermore, the particles obtained by spray drying typically have a broad size distribution, usually in the micron range.

Jet milling is a technique used to produce small particles, however, such particles tend to have undesirably broad size distributions. Only a small fraction of the particles produced using jet milling have a size that is in a desired nanometer range. Additionally, the shearing energy required for jet milling can degrade some biologically active materials and polymers.

As noted above, conventional techniques are available that produce particles from emulsions. The conventional production methods include emulsion polymerization, emulsion evaporation, emulsion extraction, and vacuum distillation of emulsions. With reference to emulsion polymerization, small particles are prepared from free-radical polymerizable monomers by using a polymerization process in the presence of water. Emulsion polymerization has an unfortunate side effect that undesirable materials, such as residual monomers, oligomers and initiators, remain in the suspension.

The emulsion evaporation process can produce a nano-particle suspension, but the process has several drawbacks. One of the drawbacks is that the process proceeds at an undesirably slow rate—exceeding 4 hours in some instances. In the emulsion extraction process, organic solvents are used that have raised concerns about possible environmental and health affects arising from residual solvent in the particles produced.

Solvent or emulsion extraction of water-in-oil-in-water (W/O/W) emulsions has been used to obtain small particles. Unfortunately, the emulsion extraction process requires large amounts of solvent for extraction, which leads to large waste streams, increased cost and residual solvent toxicity. Similarly, dilution by water of oil-in-water (O/W) emulsions prepared using partially water soluble organic solvents can obtain small particles. But, this method can result in low polymer concentrations in the final dispersion and uses undesirably large quantities of water.

Vacuum distillation has produced particles from emulsions, but the associated high operating cost makes this process economically undesirable. In addition, the processing times required for achieving a low residual solvent content in particles produced by this method is lengthy.

In view of the limitations of prior art processing methods, it would be desirable to produce particles using a technique that can result in particles having a decreased particle size in a narrow size distribution range, a reduced processing time and a reduced cost, and that does not damage or degrade the components. It would be further desirable to produce particles without using undesirably large amounts of solvent.

SUMMARY OF THE INVENTION

The present invention provides a method for producing composite particles using a supercritical fluid extraction technique on an emulsion. In accordance with the present invention, first and second materials (for example, a polymer and a biologically active material) are dissolved in a preferably non-polar solvent (i.e., oil) to form a solution. Alternatively, if the biologically active material is insoluble in the non-polar organic solvent, the material can be suspended in the solvent to form a solvent suspension. The polymer can then be dissolved into the solvent suspension. The solution/suspension is dispersed or emulsified in a polar solvent (e.g., water) to form an emulsion. Preferably, the solvent is an organic solvent, and a surfactant is added to thus form a stabile oil-in-water emulsion. The oil-in-water emulsion is contacted with a supercritical fluid to extract the solvent. Because the supercritical fluid removes the solvent from the emulsion, the dissolved materials supersaturate and precipitate out of solution as composite particles that include both the first and second materials. Accordingly, composite particles are produced in which a biologically active material is encapsulated or entrained in a biodegradable polymer matrix.

In further accordance with the invention, the biologically active material is dissolved in a polar solvent (e.g., water) to form a polar or aqueous solution. The polymer is dissolved in a non-polar and preferably organic solvent to form a solvent solution. The aqueous solution is emulsified into the solvent solution with a surfactant to form a water-in-oil (W/O) emulsion. The (W/O) emulsion is then emulsified in a second aqueous phase to form a water-in-oil-in-water (W/O/W) emulsion. The water-in-oil-in-water (W/O/W) emulsion is contacted with a supercritical fluid to extract the solvent from the solution and thereby produce composite particles that include both the polymer and the biologically active agent. The biologically active material may still be solvated in the aqueous solution while dispersed throughout the polymer matrix of the composite particle.

Alternatively, if the biologically active material is insoluble in water, it is suspended in water to form an aqueous suspension. The polymer is dissolved in the solvent to form a solvent or oil solution. The oil solution and aqueous suspension are dispersed to form a water-in-oil (W/O) emulsion. That is, the oil solution forms the continuous phase, and the aqueous suspension is dispersed in the oil solution as a discontinuous phase. The water-in-oil (W/O) emulsion is inverted with a second aqueous phase to form a multiple (W/O/W) emulsion. Thus, dispersed within the multiple (W/O/W) emulsion are droplets or micelles that contain a discontinuous oil phase, and dispersed within the oil phase are inner droplets or micelles of the aqueous suspension. When the solvent or oil is extracted according to the invention, the resultant composite particles have a polymer matrix with the biologically active material (which may be still suspended if desired or may be dried to remove all of the water) dispersed therein.

The present invention has utility in industries unrelated to the pharmaceutical industry. In yet another aspect of the invention, a composite particle is produced that includes, for example, a polymer and a pigment, metal oxide or other non-biologically active material.

DESCRIPTION OF PREFERRED EMBODIMENTS

Figure 1:
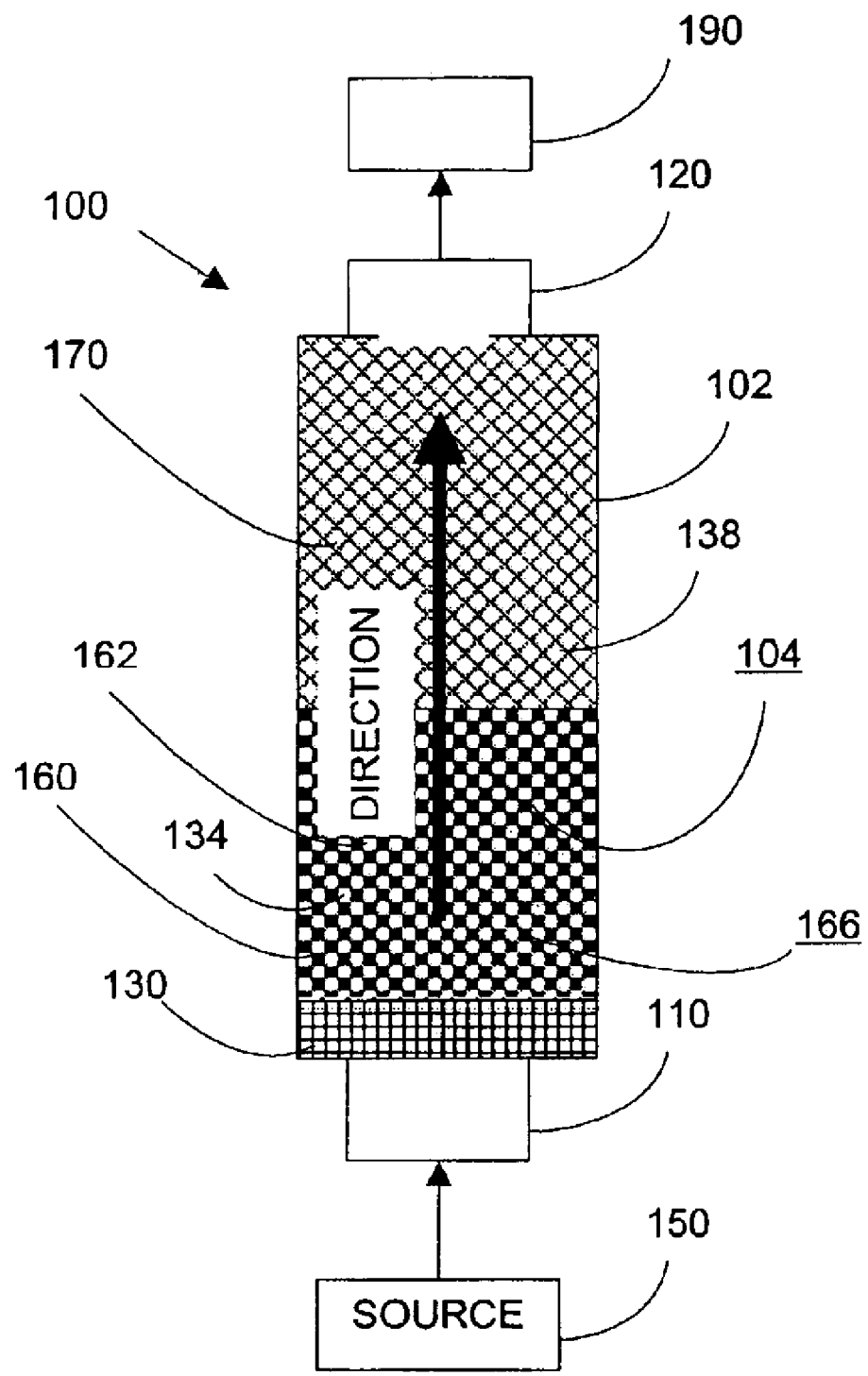
FIG. 1 is a schematic drawing of an extraction chamber used in a method according to the invention operating in a batch process mode.

The present invention provides a method of producing nano-composite and micro-composite particles using supercritical fluid extraction of an emulsion. To form the composite particles, first and second materials, for example a polymer and a biologically active material, are dissolved in a suitable solvent to form a solution. If biologically active material is insoluble in the organic solvent, it is dispersed in the solvent in the form of a suspension. The solution (or suspension) is then dispersed or emulsified in an incompatibly soluble fluid medium, typically using one or more surfactants, to form an emulsion. Preferably, the solvent is non-polar (e.g., organic or oil-based), forms the discontinuous phase, and is soluble in supercritical fluid. The continuous phase is preferably polar (e.g., water) and is generally not soluble in the supercritical fluid that is used for extraction.

The emulsion is contacted with the supercritical fluid, which removes or extracts the preferentially supercritical fluid-soluble solvent from the emulsion. The supersaturation or mass transfer caused by the removal of the solvent forms composite particles suspended in the continuous phase. The composite particles are, for example, biodegradable polymer nanoparticles having entrained biologically active material suspended in water. Drying the composite particle suspension produces a powder of the composite particles.

The present invention also provides a method of producing nano-composite and micro-composite particles using a supercritical fluid and a multiple or water-in-oil-in-water (W/O/W) emulsion. In accordance with this aspect of the invention, the polymer is dissolved in the solvent. The biologically active material is dissolved in water, or if the biologically active material is insoluble in water then the biologically active material is suspended in water. The dissolution or suspension of the biologically active material forms the aqueous phase. The aqueous phase or first water phase is emulsified in the solvent with a surfactant to form a water-in-oil (W/O) first emulsion. That is, the first emulsion has a continuous oil phase and a discontinuous water phase. The (W/O) first emulsion is then emulsified in a second water phase (preferably an aqueous phase) to form a water-in-oil-in-water (W/O/W) second emulsion. That is, the second water phase becomes the continuous phase; the discontinuous phase contains the (W/O) first emulsion. The first water phase thus forms microdroplets dispersed in an oil phase, and the oil phase is itself dispersed in the second water phase. The term "microdroplets" is not intended to imply that the microdroplets are micron-scale or micrometer in size, but rather that the microdroplets are smaller relative to the size of the emulsion droplets (W/O) that contain the microdroplets.

The water-in-oil-in-water (W/O/W) emulsion is contacted with a supercritical fluid to extract the solvent. The supercritical fluid removes the solvent from the emulsion to produce a composite particle that includes both the polymer and the biologically active agent. The biologically active material may be still dissolved or suspended in the aqueous phase while entrained in the polymer matrix. Further, during formation, a co-solvent can be used to precipitate the biologically active material from the aqueous phase, while the supercritical fluid causes the polymer to precipitate from the oil phase.

During formation of the composite particles, an optional co-solvent can be used to extract or remove the continuous phase while the supercritical fluid causes the materials (e.g., biologically active material+polymer) to precipitate from the solvent or oil phase. The removal of the continuous phase dries the suspended composite particles and can yield a concentrated slurry, cake or dry powder. A co-solvent suitable for use in an oil-in-water emulsion is, for example, an alcohol, and in particular is n-pentanol. The co-solvent should be selected with the proviso that the co-solvent does not dissolve or re-dissolve the materials used to form the composite particles.

Biodegradable polymer composite nanoparticles find application in controlled release formulations for the administration of biologically active materials because of the long circulation time in the body and for their effective carrier ability. Controlled release formulations designed using biodegradable polymer nanoparticles are sometimes desirable in applications such as medical, agricultural, veterinary and pharmaceutical applications. Advantages of these formulations can include a decreased amount of residual drug concentrations due to fewer drug doses, an improved targeting of drugs to the affected area in the body, a preserved efficacy of unstable drugs, a reduced need for patient follow up care as well as increased patient comfort and compliance.

An extraction apparatus 100 according to the invention is shown in FIG. 1. The extraction apparatus 100 includes an extractor 102. The extractor 102 has walls that define an extraction chamber 104. An inlet 110 and an outlet 120 communicate with the extraction chamber 104 through the walls of the extractor 102, and are preferably at opposite ends of the extractor 102. A frit 130 is disposed in the extraction chamber 104 at one end of the extractor 102. An emulsion-rich first layer 134, and a supercritical fluid and solvent-rich second layer 138 are disposed generally in series in the extraction chamber 104, with the emulsion-rich layer 134 proximate to the frit 130 and the supercritical fluid and solvent-rich second layer 138 proximate to the outlet 120.

A supercritical fluid source 150 communicates with the inlet 110 and supplies a supercritical fluid to the inlet 110. In a preferred method according to the invention, the supercritical fluid contains carbon dioxide ($CO_2$). The supercritical fluid is introduced into the extraction chamber 104 through the inlet 110 and further through the frit 130. That is, the supercritical fluid enters the inlet 110 and passes through the frit 130 into the extraction chamber 104. Because the first layer 134 is proximate to the frit 130, the supercritical fluid enters the extraction chamber 104 at the first layer 134. The supercritical fluid then flows in a direction indicated by the arrow labeled DIRECTION through the first layer 134.

The frit 130 is preferably metal, and more preferably stainless steel. Further, the frit 130 preferably has a high porosity with small holes and is disposed inside the extraction chamber 104 proximate to the inlet 110. A flow of supercritical fluid passing through the frit 130 is broken into many smaller flows, droplets or bubbles of supercritical fluid, thus increasing a surface or interfacial contact area of the supercritical fluid.

In the emulsion-rich first layer 134, emulsion droplets 160 and $CO_2$ droplets 162 are suspended in an aqueous matrix 166. In this method, the aqueous matrix 166 is a polar solvent, and is preferably water. The emulsion droplets 160 and $CO_2$ droplets 162 contact each other in the first layer 134. Because the solvent is preferentially soluble in the $CO_2$ droplets 162, the solvent migrates from the emulsion droplets 160 into the $CO_2$ droplets 162 and is entrained therein.

The $CO_2$ droplets 162 continue into and through the second layer 138 carrying the dissolved solvent therein. An optional layer of glass wool 170 can be disposed in the extraction chamber 104 to reduce the dead volume of the extraction chamber 104, preferably the glass wool 170 is co-extensive with the second layer 138. If the glass wool 170 is present, the solvent-bearing $CO_2$ droplets 162 pass therethrough. The $CO_2$ droplets 162 (bearing the dissolved solvent therein) exit the extraction chamber 104 through the outlet 120. A recovery unit 190 can recover the supercritical fluid and/or any solvent entrained or dissolved into the supercritical fluid, or the supercritical fluid and/or solvent can be vented to atmosphere, as desired.

As used herein, polar, aqueous, supercritical fluid-insoluble and water are used interchangeably. Non-polar, solvent, organic solvent and supercritical fluid soluble are used interchangeably. Preferably, an organic solvent is selected that is immiscible or emulsifiable with water. Preferred organic solvents that are immiscible in water include, for example, toluene, cyclohexane, and hexane.

The biologically active material is, for example, a therapeutic agent that has at least one of the following properties: soluble in a solvent or oil phase, soluble in water or the aqueous phase, suitable for forming suspensions in water or an aqueous phase and/or is suitable for forming suspensions in the organic solvent of the oil phase. The therapeutic agent can be a steroid, drug, medicinal agent, nutritional material, protein, peptide, alkaloid, alkyloid, animal and/or plant extract, antigen, nucleic acid or other genetic sequence, viral material, antibiotic, sugar, nutriceutical and/or a vitamin. In addition, it is recognized that certain combinations of biologically active materials are particularly effective when used together. For example, multiple antibiotics (an "antibiotic cocktail"), or a protein with a stabilizing agent such as a sugar, are especially effective when used together. Also, some biologically active materials are particularly efficacious when used with an activating substance, for example insulin with glucose. And, some biologically active material combinations act synergistically when used together. Accordingly, the use of one or more biologically active materials is within the scope of the term 'biologically active material.'

The polymer is preferably a biodegradable polymer that is soluble in a non-polar phase, that is, an organic solvent. Depending on the application, other types of polymers are useful. A desired delivery mechanism is influential in determining the suitability of the polymer. Oral, nasal, colonic, transdermal, rectal, vaginal, subcutaneous, inhalation or pulmonary, and other delivery mechanisms are all suitable applications having different requirements for the polymer. Accordingly, appropriate polymers are determined by the demands of the application. The polymer may also be in the form of monomers or polymer precursors, and polymerization may occur before or during the contact with the supercritical fluid. In addition, lipids may be used as the matrix material.

For oral delivery of drugs to be released in the colon, a polymer is selected that can withstand stomach acid and metabolism by pancreatic enzymes so as to deliver the biologically active material past the stomach and later in the gastrointestinal tract. In addition, an enzyme inhibitor can also be added to reduce the degradation by the passage through the stomach. This colon-targeted delivery is contemplated as a subset of a time delayed release mechanism or a site-specific delivery method. By controlling the rate of biodegradation and/or biologically active material migration out of the composite particle, the delivery time, rate and mechanism of the biologically active material is narrowly controlled.

For transdermal applications, the polymer is controlled so as to protect and deliver the biologically active material into a person's body before releasing the biologically active material. For example, if an ionic material is required for a, transdermal application but the biologically active material is not ionic, an ionic polymer is selected. Alternatively, if the biologically active material is water-soluble and a lipophilic material is necessary for the transdermal application, an appropriate polymer can again be selected. Preferable biodegradable polymers include thermoplastic aliphatic polyesters such as polylactide (PLA), polyglycolide (PGA), and the copolymer of lactide and glycolide referred to as polylactide-co-glycolide (PLGA) because of their desirable bio-compatibility, biodegradability, and mechanical strength.

The emulsification of the polar and non-polar phases is accomplished by a emulsification device. The emulsification device can be a microfluidizer, an ultrasonic horn, a dispersator, a static mixer, a colloid mill, a fluid energy mill, a turbine mixer, a spontaneous emulsification technique or commercially available equivalents thereof.

A surfactant may be added to control the stability of the emulsion. The amount of surfactant is minimized because of the rapid speed of the extraction of the solvent from the emulsion. The relatively rapid extraction decreases the time that the emulsion needs to remain stabile. Preferably, the surfactant is added in order to obtain uniform or fine particles, effective encapsulation or dispersion of the biologically active material in the polymer matrix, or other property related to the use or administration of the composite particle. During particle formation, the surfactant molecules present in the system can surround forming nuclei after formation to hinder particle growth due to agglomeration.

The supercritical fluid is preferably supercritical carbon dioxide ("$CO_2$"). However, suitable alternative preferable supercritical fluids include nitrogen, trifluoro methane, nitrous oxide, dimethyl ether, straight chain or branched C1–C6-alkanes, alkenes, alcohols, and combinations thereof. Preferable alkanes and alcohols include ethane, ethanol, propane, propanol, butane, butanol, isopropane, isopropanol, and the like. The supercritical fluid is chosen generally with reference to the solubility of the solvent and/or co-solvents present in the emulsion. As used herein, supercritical can include near-critical, compressed and liquefied gas as well as supercritical fluids.

With reference to FIG. 1 and to a first method in accordance with the present invention, a polymer is dissolved in a suitable organic solvent to form a solution. A biologically active material (bioactive) is also dissolved in the solution. The above solution is then dispersed in a non-miscible liquid (which is preferably water) to form an emulsion. This is an oil-in-water (O/W) emulsion. Both the polymer and the biologically active material are dissolved in the solvent or oil phase. Alternatively, the biologically active material is insoluble in the organic solvent, and is suspended in the organic solvent to form a suspension. The polymer is soluble in the organic solvent, and is dissolved in the organic solvent to form a solution. The above organic suspension/solution is dispersed in water to form an oil-in-water (O/W) emulsion.

In another alternative embodiment, a water-soluble biologically active material is dissolved in water to form an aqueous solution. A polymer is dissolved in an organic solvent to form a solvent solution. The aqueous solution is dispersed in the organic solution to create a water-in-oil emulsion (W/O). A surfactant is added to stabilize the solution. In addition, a partially soluble solvent is be used. The W/O emulsion is dispersed in a second aqueous liquid to form a W/O/W emulsion. The W/O/W emulsion is thus an aqueous phase having dispersed therein very tiny micelles of an O/W emulsion. The supercritical fluid is bubbled through the W/O/W emulsion. When the supercritical fluid contacts a micelle, the solvent migrates to the supercritical fluid phase. As the solvent migrates, the micelle collapses—trapping and entraining the water-soluble biologically active material within the boundaries of the water insoluble particle. The composite particle is then recovered.

Oil-in-water (O/W) emulsions are particularly suited for situations where both the polymer and the biologically active material are soluble in an organic solvent, or if the polymer is soluble in the organic solvent and if the biologically active material forms a suitable suspension in the solvent. In contrast, water-in-oil-in-water (W/O/W) or multiple emulsions are particularly suited for situations where the polymer is soluble in an organic solvent and the biologically active material is soluble or suspendable in water. Because solubility is seldom absolute, there exists a plethora of applications in which emulsion permutations are particularly efficacious. For example, the solvent is partially miscible with water or preferentially soluble in the supercritical fluid relative to water. Additionally, the polymer, the biologically active materials, and any additional materials to be incorporated into the composite particle can have varied degrees of solubility in either the solvent or the water. Accordingly, the use of water-in-oil-in-water (W/O/W) emulsions or (W/O/W/O . . . ) emulsions are selected so as to achieve predetermined criteria, such as, for example, processing ease and particle size.

The emulsion is an aqueous medium or continuous phase in which organic solvent micelles are suspended to form the discontinuous phase. The micelles of organic solvent include the dissolved polymer and biologically active material. Depending on the choice of surfactant, the micelles can either have the surfactant dispersed throughout the micelle, or the micelles form a sphere and shell arrangement with the surfactant. In the sphere and shell, the solvent micelle forms the sphere, and the surfactant coats the surface of the sphere to form barrier between the emulsion inside and the aqueous medium outside. The surfactant can also be selected so that when used in the method, the surfactant acts as a chemical barrier to prevent the particle from agglomerating after the particularization has occurred.

If desired, the (O/W) emulsion is dispersed in an aqueous phase with agitation using one or more additional surfactants to form a water-in-oil-in-water (W/O/W) second emulsion. This process is repeated as many times as desired or is practicable. Thus, a W/O/W/O/W . . . emulsion is possible. Each of the iterations can further decrease the particle size, and can incorporate additional materials that were dissolved in the emulsification medium. Additional benefits from this technique may be recognized in the future, but currently there appears to be a diminishing return on the benefits of numerous emulsion iterations.

Conventional surfactants that can form water-in-oil, oil-in-water and water-in-oil-in-water emulsions are preferably used with this method. Particularly suitable surfactants include bovine serum albumin, poly vinyl alcohol, phosphatidyl choline, glychocholates, and oleates. Preferred oleates include sorbitan monooleate (SPAN) and polyoxyethylene sorbitan monooleate (TWEEN). TWEEN and SPAN are commercially available from ICI Americas, Inc. Preferably, the surfactant used in this embodiment has a hydrophobic/lipophobic balance (HLB) suitable to form stable w/o or o/w or w/o/w emulsions. The use of a non-toxic Food and Drug Administration (FDA) approved surfactant is preferred. The surfactant is selected using additional criteria so that when used in the process, the surfactant acts as a chemical barrier to prevent the composite particles from agglomerating.

Adjusting the concentration of surfactant, the agitation speed within the dispersator and the degree of homogenation controls the size of the emulsion micelles. Higher concentrations of surfactants, higher agitation speeds and higher degrees of homogenation tend to produce smaller micelles. In addition to the concentration of the surfactant, and speed and time of the agitation and homogenation, other factors that are controlled to affect micelle properties. The other factors include emulsion droplets size, concentration of the polymer in the organic solvent, oil concentration in the emulsion, water content in the emulsion, and amount of the biologically active material in the emulsion. The above factors are parameters that are selected to control the end-particle size and properties. Once formed, the micelles preferably remain at the desired size for extended periods of time and produce particle sizes that range preferably from 0.1 nanometers to 10 micrometers. The particle size distribution is narrowly controlled. If desired, the process parameters are controlled so that the composite particle sizes can range up to several microns in diameter, however composite particles having diameters in the nanometer range are preferred.

Alternatively, supercritical $CO_2$ is bubbled through a W/O/W emulsion. The supercritical $CO_2$ extracts the solvent from the W/O micelles that are dispersed in the aqueous phase. Because of the loss of the solvent from the W/O micelle, the polymer and biologically active material precipitate out of the W/O/W emulsion. The polymer precipitate forms a matrix in which the biologically active material is entrained. That is, the composite particles contain the biologically active material contained within or dispersed throughout the polymer matrix. The biologically active material is generally still suspended in the original water phase inside the polymer matrix. Such a composite particle having a biodegradable polymer is useful, for example, as a controlled release formulation for drug delivery and for drug targeting.

Composite particle size is closely related to the droplet size of the starting emulsion when using O/W emulsions. This is because the gradual diffusion of solvent out of the emulsion droplet causes the polymer in the droplet to self-aggregate and precipitation.

Figure 2:
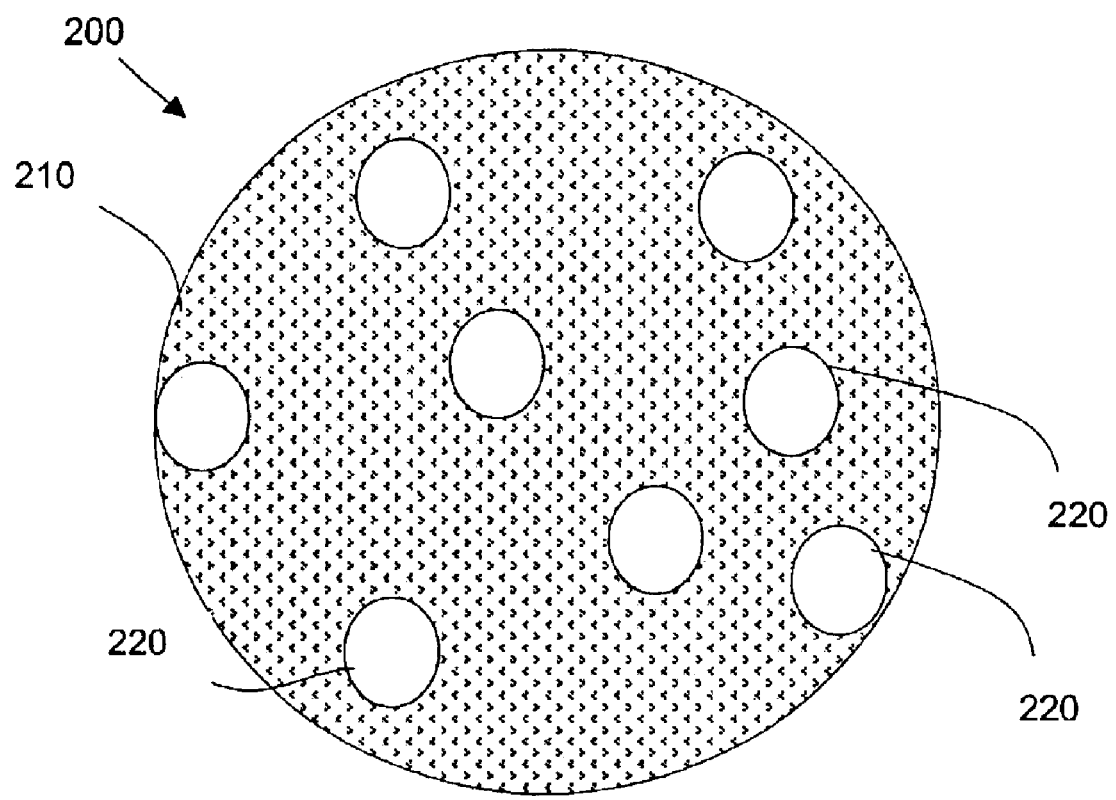
FIG. 2 is a cross sectional schematic view of a composite particle produced in accordance with the invention.
Figure 3:
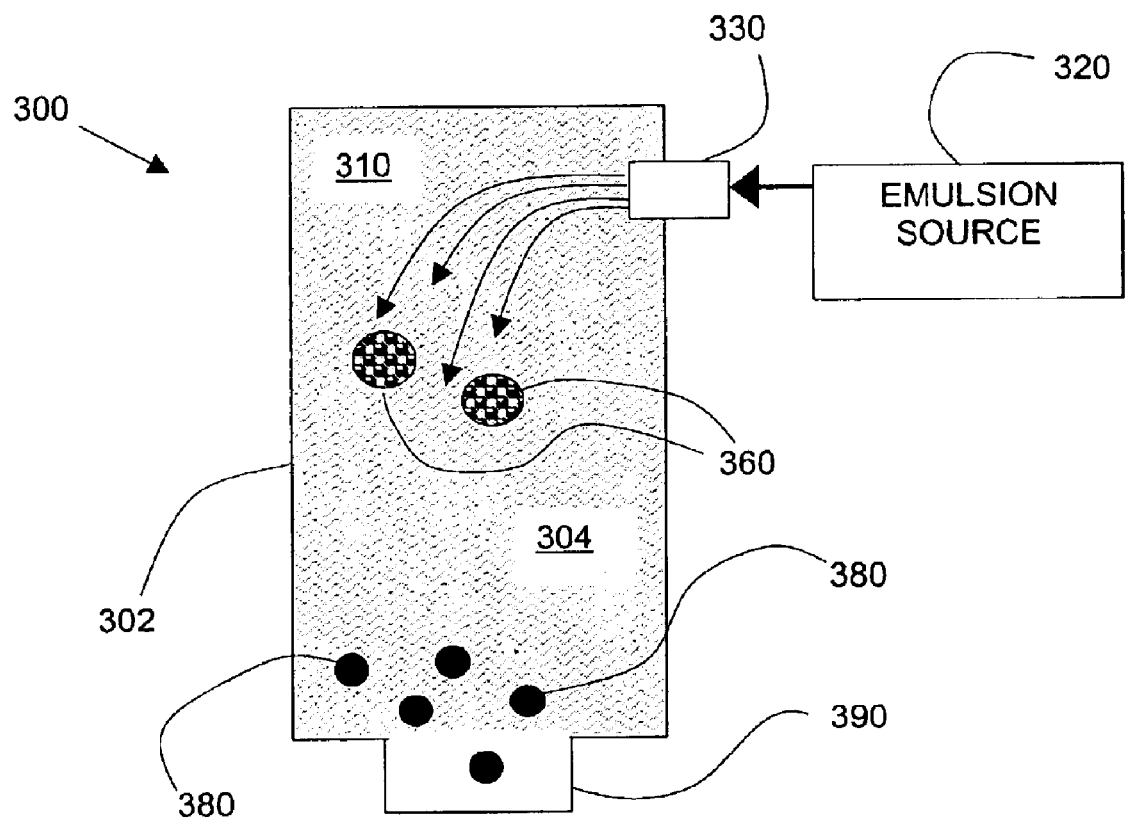
FIG. 3 is a schematic drawing of an apparatus for use with a method in accordance with the invention.

With reference to FIG. 2, a schematic cross-sectional diagram of a composite particle produced by a method in accordance with the invention is shown. When the emulsion micelle or droplet contacts against a supercritical fluid droplet in an extraction chamber, the non-polar solvent the transfers from the emulsion micelle into the supercritical fluid. As the solvent migrates out of the emulsion micelle, the polymer and biologically active material remain in the emulsion micelle. The emulsion micelle collapses into a solid fine composite particle 200. The composite particle 200 has a polymer matrix 210. Discrete amounts of biologically active material 220 are entrained within the polymer matrix 210.

In a second method in accordance with the present invention, an O/W or W/O/W emulsion is prepared in a manner similar to the manner described above, but a partially water-soluble organic solvent is used rather than a non-miscible solvent. That is, materials to be particulatized, e.g. a polymer is dissolved in a partially water-soluble solvent and a biologically active material is dissolved or suspended in water or the partially water soluble organic solvent. Suitable organic solvents that are partially miscible in water can include, for example, Ethyl acetate, propyl acetate, and 2-butanone.

The polymer-bearing, partially water-soluble solvent is emulsified with the biologically active material in the water with a surfactant to form an O/W or a W/O/W emulsion (either suspended or dissolved in the solvent) in the water with a surfactant to form an O/W emulsion. Because of the partial solubility of the solvent in the water, a thermodynamic equilibrium forms between the partially solvated solvent and the aqueous phase of the O/W emulsion. When the biologically active material is dissolved or suspended in water the aqueous solution or suspension is dispersed in the partial water-soluble solvent to form a W/O emulsion. The W/O emulsion can be then further emulsified or dispersed in a second water phase to form a W/O/W emulsion. As in the case of O/W emulsions, a thermodynamic equilibrium forms between the partially solvated solvent and the aqueous phase in case of the W/O/W emulsion.

Subsequently, the emulsion is contacted with the supercritical fluid in accordance with the invention. The supercritical fluid extracts the solvent from the emulsion. Because there is an additional portion of solvent partially solvated in the aqueous phase, in addition to extracting the solvent directly from the emulsion micelles, the supercritical fluid also extracts out solvent that is dissolved in the external aqueous phase of the O/W or W/O/W emulsion.

The extraction of the solvent disturbs and shifts the thermodynamic equilibrium between the partially solvated solvent and the aqueous phase. As a result of the disturbance, a rapid mass transfer of the solvent occurs from the emulsion droplet and into the aqueous phase. The mass transfer results in the supersaturation and precipitation of the biologically active material and the polymer as composite particles.

The rate of solvent extraction/mass transfer is useful to determine the composite particle size. With supercritical $CO_2$, the rate of extraction of the organic solvent is very fast. Fast extraction can lead to the formation of very small particles.

The compositions or materials to be particulatized, e.g. the polymer and the biologically active material, are preferably either insoluble or only slightly soluble in water. Because many pharmaceuticals and polymers are insoluble or slightly soluble in water, some methods according to the invention are particularly suited for use with such pharmaceuticals, polymers and combinations thereof. The pharmaceutical compositions can be delivered to patients as colloidal suspensions in water. Alternatively, the particulate can be filtered from the aqueous phase and recovered for use in a form other than a colloidal suspension, for example as a dry powder or a concentrated cake or paste.

In another method according to the invention, an immiscible organic solvent and a co-solvent are used. A different co-solvent from the co-solvent mentioned above for extracting water is used when a polymer that is relatively difficult to dissolve in only the organic solvent is used. The co-solvent enhances the solubility of the polymer in the solvent. An example of a suitable co-solvent is acetone with respect to the polymer propylene carbonate, or if polymer of lactide/glycolide (PLG) is dissolved in ethyl acetate.

In another method in accordance with the invention, an apparatus 300 is provided. A housing 302 defines a chamber 304 in which a supercritical phase 310 is maintained. An emulsion source 320 provides a W/O/W or an O/W emulsion to a nozzle 330. The nozzle 330 defines an array of fine apertures. The emulsion is directed to the nozzle 330 and further through the apertures and into the supercritical phase 310 so as to be injected into the supercritical $CO_2$ 310. Tiny emulsion spray-drops 360 of the emulsion are formed in the supercritical phase 310. The emulsion spray-drops 360 have diameters about the same as a diameter of the apertures defined by the nozzle 330. Because the emulsion spray-drops 360 are an emulsion, the emulsion spray-drops 360 comprise an organic phase and an aqueous phase. A mass transfer between the organic phase in the emulsion spray-drops 360 and the supercritical phase 310 causes supersaturation in the emulsion spray-drops 360. Supersaturation precipitates the polymer and the co-dissolved or suspended biologically active material in the form of fine composite particles 380. The composite particles 380 fall to the bottom of the housing 310 and are collected in a trap 390 located there.

In this method, the transfer rate between the organic phase and the supercritical phase is rapid. The motion of the tiny emulsion spray-drops 360 within the supercritical phase 310 enhances the transfer rate. A surfactant is added to either the supercritical phase 310 or to the emulsion. The surfactant inhibits particle growth by stabilizing the nuclei formed in the emulsion spray-drops 360 during or immediately after the mass transfer. The particles 380 obtained using the method are typically in the nanometer range, and are generally spherical or needle shaped.

The particles 380 are obtained in the form of an aqueous suspension. Pure particles are obtained by filtering the aqueous suspension using ultra filtration or high-speed centrifugation. The method is used to make composite particles of a variety of different materials, and is suitable for use with both water insoluble and partially water-soluble organic solvents.

In a preferred method according to the invention, the emulsion and the supercritical fluid are supplied into the extraction chamber in a continuous manner. Particles are formed in a manner similar to the particle formation processes described hereinabove. The aqueous suspension of the particles and the solvent-bearing supercritical fluid are removed from the extraction chamber so that the mass, volume and pressure in the extraction chamber remain generally unchanged. That is, the rate of removal of materials from the extraction chamber is about the same as the rate that materials are entering the chamber. Accordingly, the particle formation process is maintained in a continuous manner, rather than as a batch process.

In an alternative application, a second material, that is, something other than the biologically active material discussed above, is entrained in a polymer matrix to form the composite particle. For example, the coating industry has application for a pigment or a colorant rather than the biologically active material. In such an application, the composite particle includes the pigment entrained in a polymer matrix. Where the application for the composite particle is not for use inside a living body, other methods are employed to release the entrained material from the polymer matrix. For example, the pigment is released by heat melting of the polymer rather than by biodegradation or migration.

Accordingly, the current invention is suitable for use producing nano-particles or micro-particles of a polymer having a non-biologically active material entrained within it, so as to form a composite particle. These composite particles can find application in various industries. Exemplary industries include pharmaceutical, paint and coating, electronic, agricultural, medical and veterinary industries. The materials preferably include a toxin, insecticide, diagnostic aid, agricultural chemical, dye, pigment, paint, cosmetic, explosive, enzyme, catalyst or a combination thereof.

EXAMPLES

Example 1

EXAMPLE 1—Illustrates the production of Indomethacin (IN) (10% loading) loaded Polylactide-co-glycolide (PLGA) particles.

Preparation of PLGA/IN Emulsion:

Initially, a PLGA/IN solution was prepared by dissolving 10% (w/w$_{EA}$) of PLGA (6.0 g) and IN (0.6 g) into water-saturated ethyl acetate (EA) to form SOLUTION 1(a). 0.7 grams of poly vinyl alcohol (PVA) surfactant was dissolved in water saturated with ethyl acetate to form SOLUTION 1(b). SOLUTION 1(a) was mixed into 140 grams of SOLUTION 1(b) to form MIXTURE 1(a). Accordingly, the resultant concentrations were EA at 30% w/w total, water at 70% w/w total, EU at 10% w/w EA, and PVA at 0.5% w/w water. MIXTURE 1(a) was emulsified using a dispersator for 3 minutes at 5000 rpm to form EMULSION 1(a).

Production of IN Loaded PLGA Particles:

In an the extraction chamber having a volume of 10 ml, glass wool and beads were packed inside the dead volume of the extraction chamber to prevent liquid entrainment during extraction. The glass wool and beads also minimized the re-precipitation of residual toluene during depressurization. A 6.0 ml aliquot of EMULSION 1(a) was loaded into the extraction chamber. Supercritical $CO_2$ was then bubbled into the extraction chamber through a 0.5 $\mu$m stainless steel frit that was disposed at the bottom of the extraction chamber. The conditions in the extraction chamber were maintained at a pressure of 80 bar and a temperature of 45 degrees Celsius (° C.). The $CO_2$ was bubbled through the extraction chamber at a flow rate at 1 milliliter per minute (ml/min). The extraction of EA was complete in 60 minutes. The extraction chamber was depressurized and opened. An aqueous colloidal suspension of PLGA/IN composite particles was obtained and removed from the extraction chamber.

Figure 4:
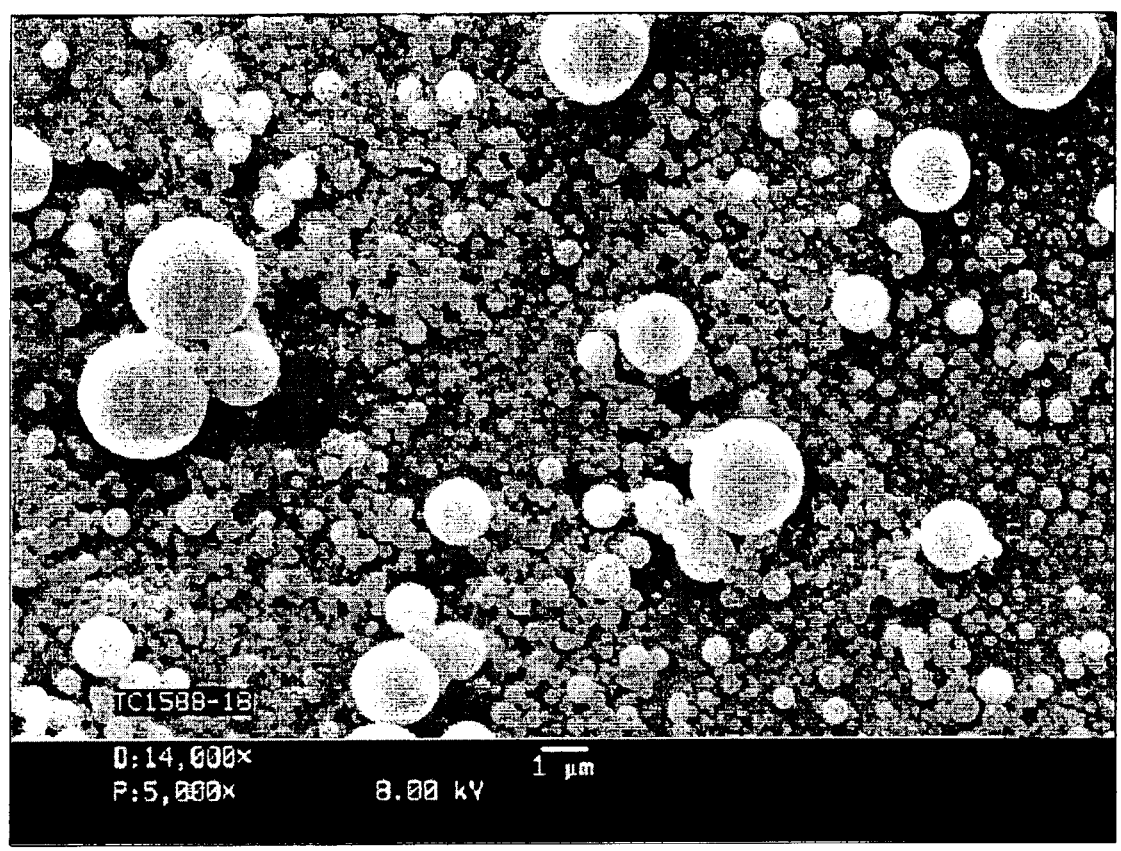
FIG. 4 is an SEM micrograph of composite particles produced in EXAMPLE 1 of the present invention.
Figure 5:
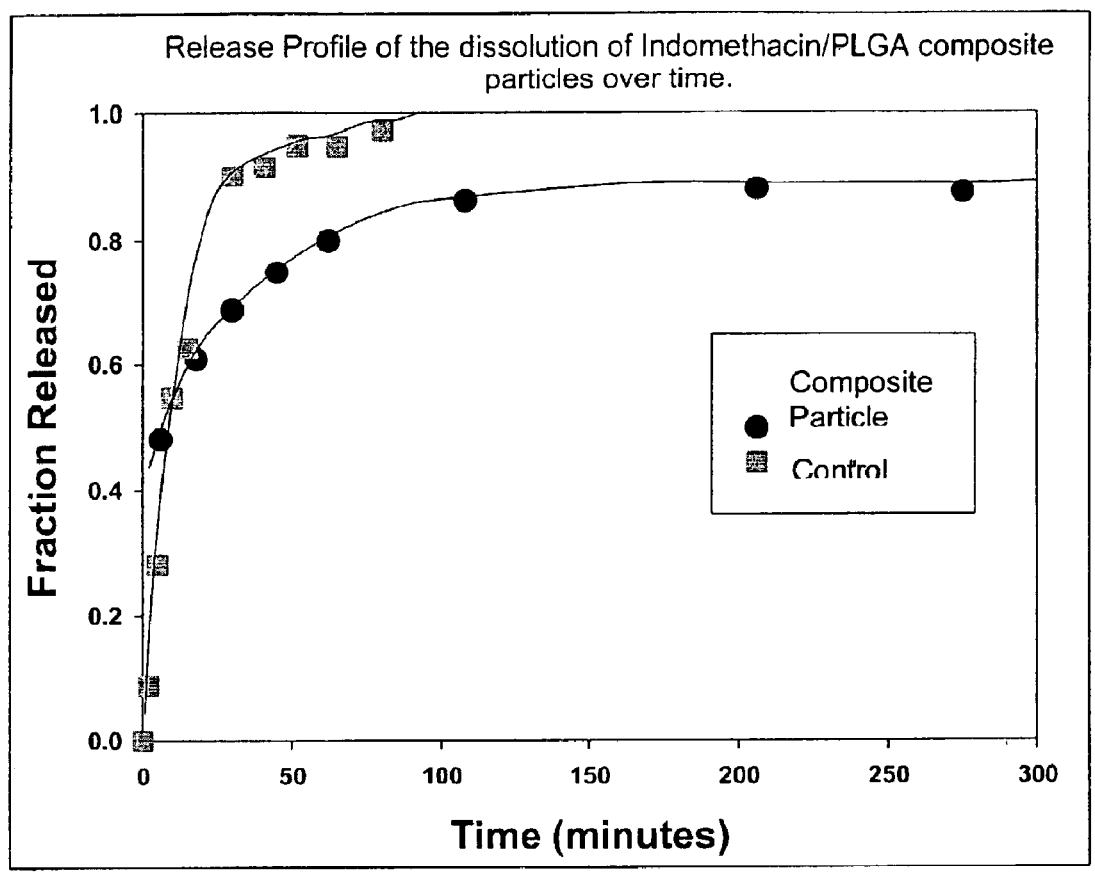
FIG. 5 is a graph of the release profile of the composite particles shown in FIG. 4.

Analysis of PLGA/IN Particles:

Analysis of the morphology of PLGA/IN particles in the aqueous colloidal suspension obtained was performed using Scanning Electron Microscopy (SEM). The size distribution analysis was carried out using Dynamic Light Scattering (DLS). From the SEM micrograph, an example of which is shown in FIG. 4, it was determined that PLGA/IN particles were in the form of isolated spherical particles having a generally uniform mean size. From the DLS results, the PLGA/IN particles had a volume average of 881 nanometers (nm) with a standard deviation of 507 nm. The graph in FIG. 5 illustrates the release profile of IN from the composite particles in a phosphate buffer solution (ph 7.4) at 37° C. The figure shows that nearly 80% of the drug is released in 400 minutes.

Example 2

EXAMPLE 2—Illustrates the production of Ketoprofen (KP) (25% loading) loaded Polylactide-co-glycolide (PLGA) particles.

Preparation of PLGA/KP Emulsion:

EMULSION 2(a) in EXAMPLE 2 was prepared in a manner similar to the EMULSION 1(a) in EXAMPLE 1 except as indicated below. EMULSION 2(a) was prepared having using 4.0 g PLGA and 1.0 g KP in 40.0 g of ethyl acetate, which was dispersed in 160.0 g water with 0.5% w/w PVA.

Production of PLGA/KP Particles:

Particles in EXAMPLE 2 were produced in the same manner as the particles that were produced in EXAMPLE 1.

Figure 6:
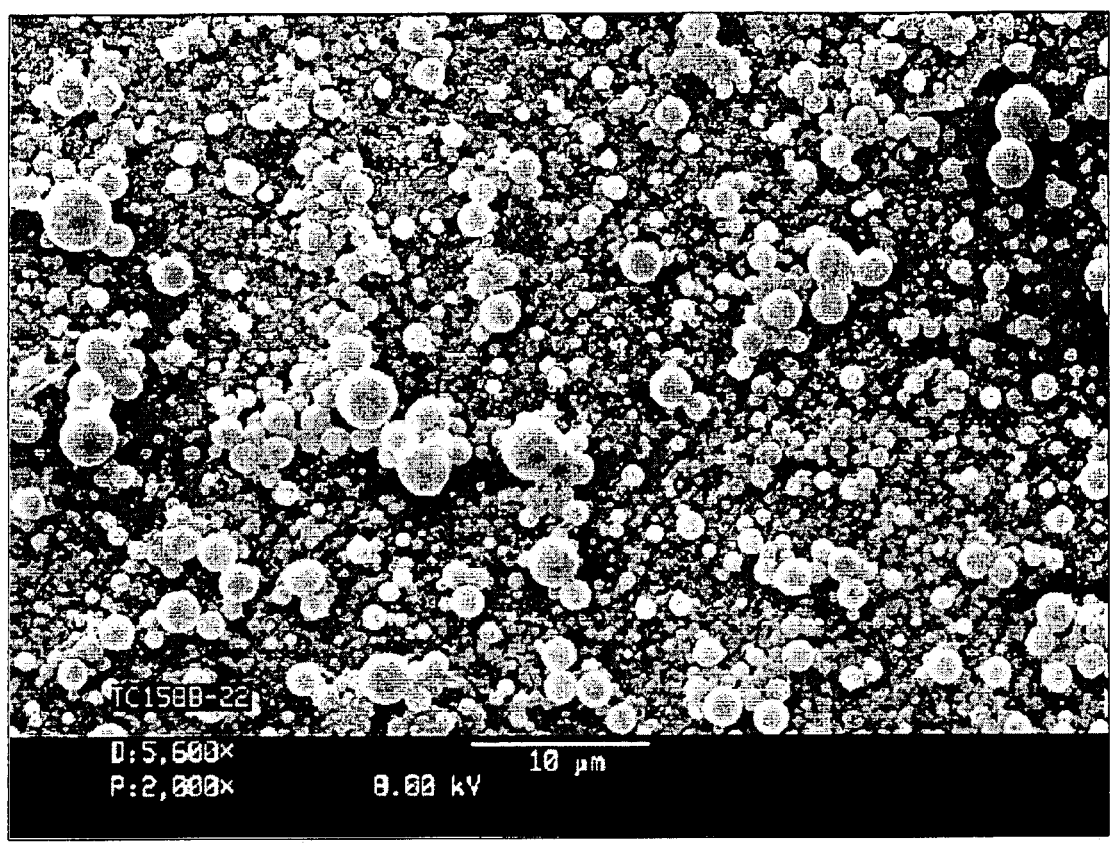
FIG. 6 is an SEM micrograph of composite particles produced in EXAMPLE 2 of the present invention.
Figure 7:
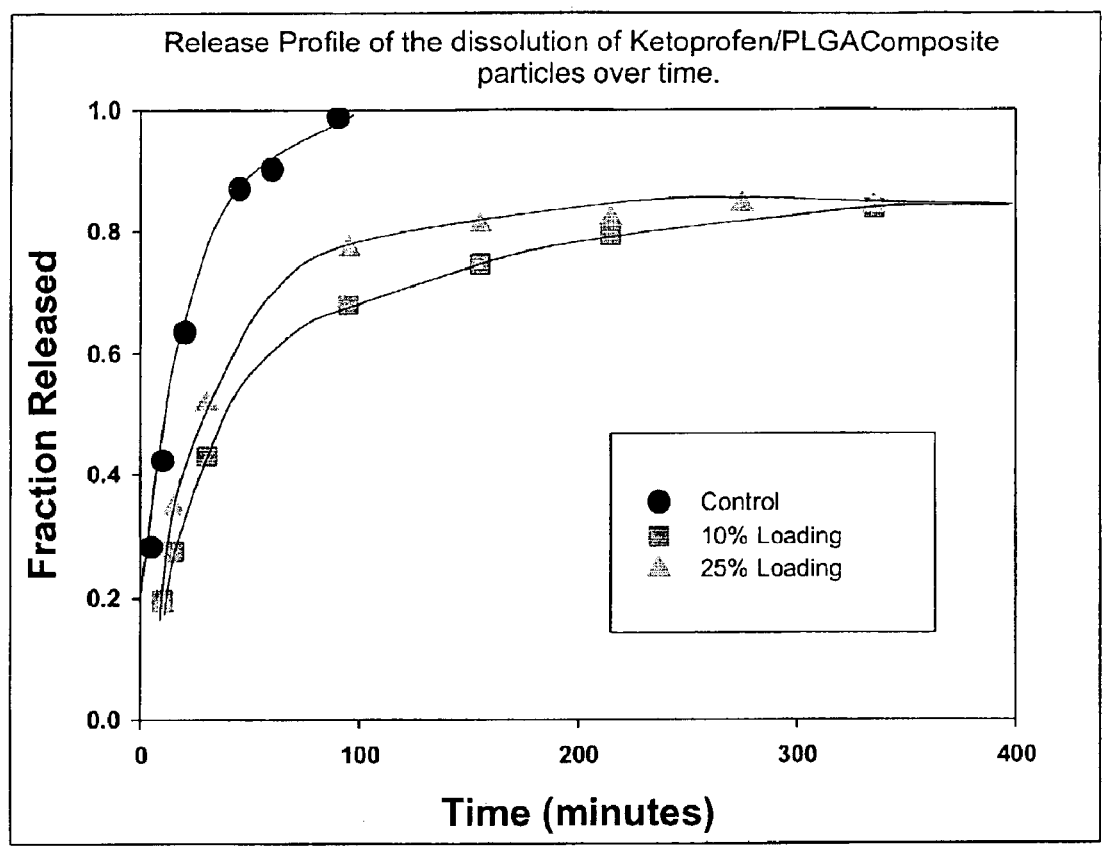
FIG. 7 is a graph of the release profile of the composite particles shown in FIG. 6.

Analysis of PLGA/IN Particles:

Analysis of the morphology of PLGA/KP particles in the aqueous colloidal suspension obtained was performed in the same manner as EXAMPLE 1. FIG. 6 is an SEM micrograph of PLGA/KP particles produced in EXAMPLE 2. As in EXAMPLE 1, the particles are spherical in shape having a fairly narrow size distribution. From the DLS results, the particles produced had a volume average of 900 nanometers (nm) with a standard deviation of 553 nm. The graph in FIG. 7 illustrates the release profile of KP from the composite particles in a phosphate buffer solution (ph 7.4) at 37° C. The figure shows that nearly 80% of the drug is released in 400 minutes.

Example 3

EXAMPLE 3—Illustrates the production of Insulin (INS) encapsulated in hollow PLGA particles.

Preparation of PLGA/INS Emulsion:

Initially, 1.0 grams of insulin (INS) was dissolved into 10 milliliters of a very dilute solution of hydrochloric acid (pH 4) to produce SOLUTION 3(a). SOLUTION 3(b) was prepared by dissolving into dichloromethane (DCM): PLGA at 5% w/w DCM, and polyvinyl alcohol at 5% w/w DCM. 10 mls of SOLUTION 3(a) was mixed into 100 ml of SOLUTION 3(b) to form MIXTURE 3(a). MIXTURE 3(a) was dispersed using a commercially available homogenizer (e.g., Microfluidics Inc., Model 110L) at 14,000 psi (3 pases) to form a W/O EMULSION 3(a).

PVA 0.5% (w/w) was dissolved in 160.0 grams of water-saturated EA solution to form SOLUTION 3(c). 40.0 grams of EMULSION 3(a) was mixed into 160 grams of SOLUTION 3(c) to form MIXTURE 3(b). MIXTURE 3(b) was emulsified using a dispersator for 3 minutes at 6000 rpm to form a W/O/W multiple EMULSION 3(B).

Production of INS Loaded PLGA Particles:

Particles in EXAMPLE 3 were produced in a manner similar to the manner used in EXAMPLE 1.

Figure 8:
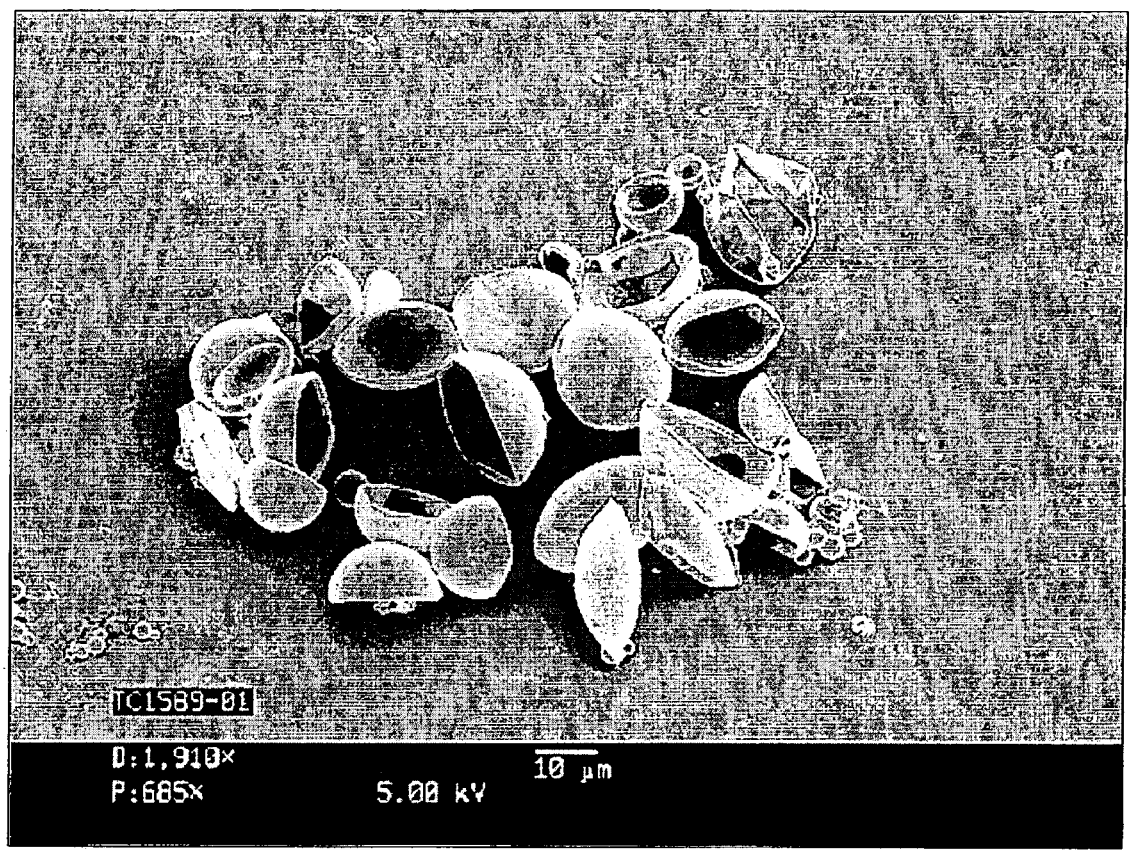
FIG. 8 is an SEM micrograph of composite particles produced in EXAMPLE 3 of the present invention.

Analysis of PLGA/INS Particles:

Analysis of the morphology of PLGA/INS particles in the aqueous colloidal suspension obtained was performed using Scanning Electron Microscopy (SEM). From the SEM micrograph, an example of which is shown in FIG. 8, it was determined that PLGA/INS particles were isolated hollow spherical shells having a mean size in a range of from about 5 to about 10 microns.

Example 4

EXAMPLE 4—Illustrates the precipitation of Poly(lactide)-glycolide (PLGA) encapsulated Indomethacin (IN) nanoparticles produced in a continuous manner by a method according to the invention.

Preparation of PLGA/IN Emulsions.

5.0 grams of Poly(lactide)-glycolide (PLGA) and 0.85 g of Indomethacin (IN) were added into 40.1 g of ethyl acetate saturated with water. Once added, the PLGA and IN dissolved to form SOLUTION 4(a). SOLUTUION 4(b) was formed by dissolving PVA (1% by weight) into water saturated with ethyl acetate. SOLUTION 4(a) was mixed into 160 g of SOLUTION 4(b) to form MIXTURE 4(a).

MIXTURE 4(a) was divided into portions, which were homogenized using a Microfluidizer to form EMULSIONS 4(a)–4(c). Another portion of the mixture was homogenized using a Dispersator to form EMULSION 4(d). The droplet sizes were determined using DLS, and are listed in TABLE 1.

TABLE 1

Droplet sizes and homogenization conditions for EMULSIONS 4(a)-4(d).

| Emulsion Number | Homogenization conditions | Droplet size (nm) |
| --- | --- | --- |
| 4(a) | 18000 psi (4 passes) | 312 |
| 4(b) | 7050 psi (4 passes) | 428 |
| 4(c) | 3525 psi (4 passes) | 703 |
| 4(d) | 4000 rpm for 2 min | 1887 |

Preparation of of PLGA/IN Nanoparticles:

First, 200 milliliters (ml) of the emulsion of EXAMPLE 1 were loaded or pumped by the emulsion pump into the extractor. Simultaneously, the supercritical fluid pump pumped supercritical $CO_2$ into the extraction chamber through the frit at the bottom of the extractor. The extraction chamber was maintained at a constant pressure and temperature (80 bar and 40° Celsius, respectively) throughout the experiment. The flow rate of the supercritical $CO_2$ and the emulsion through the extraction chamber was also maintained at a constant rate: 20 g/min $CO_2$ and 1 ml/min of emulsion. The supercritical $CO_2$ flowed upward and contacted against the emulsion spray-drops that flowed downward. The supercritical $CO_2$ dissolved the ethyl acetate from the emulsion spray-drops and carried the ethyl acetate out of the chamber. The dissolution and loss of the ethyl acetate from the emulsion spray-drops caused the PLGA to precipitate into fine particles suspended in the water phase of the emulsion spray-drops. The suspended particles and the water/surfactant mixture flowed downward into the liquid suspension phase. An aqueous colloidal suspension of IN encapsulated. PLGA particles was obtained.

Analysis of PLGA/IN Nanoparticles:

Analysis of the aqueous colloidal suspension of PLGA/IN composite particles was performed using a Scanning Electron Microscope (SEM) and DLS. The residual solvent content in the aqueous suspension was determined using gas chromatography (GC) and was found to be about 50 parts per million (ppm).

Figure 9:
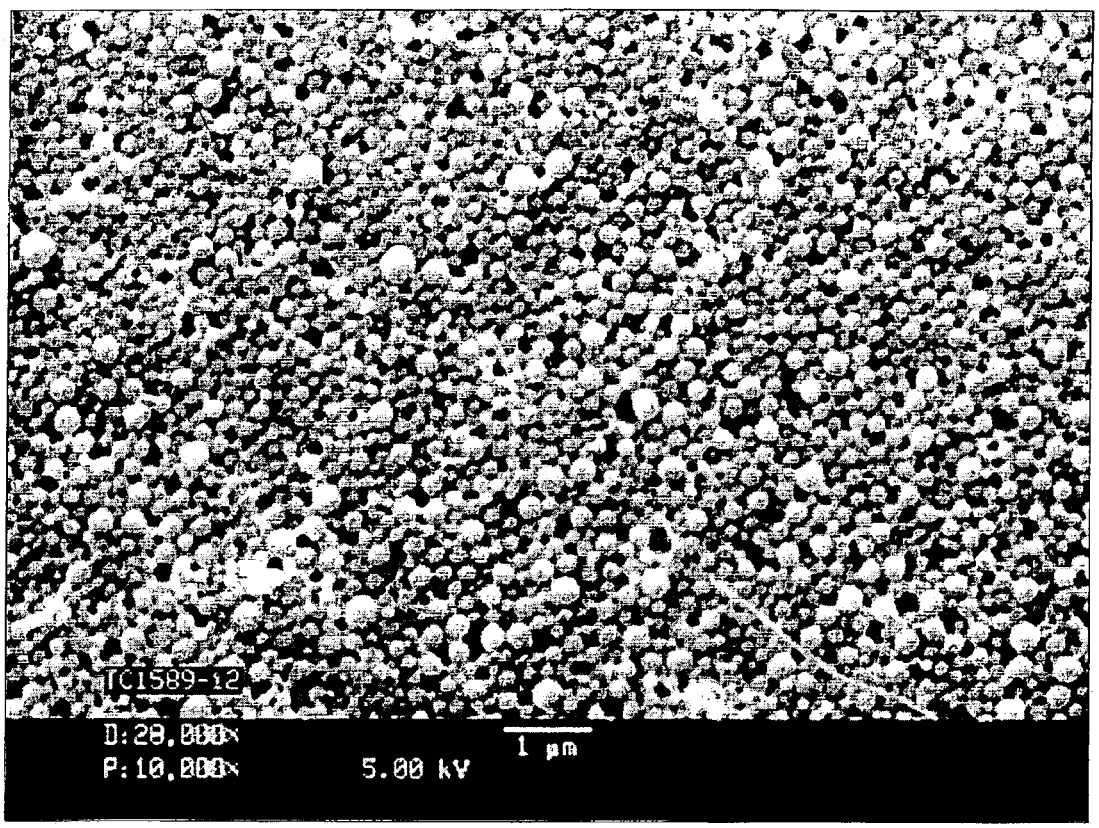
FIG. 9 is an SEM micrograph of composite particles produced in EXAMPLE 4(a) of the present invention.
Figure 10:
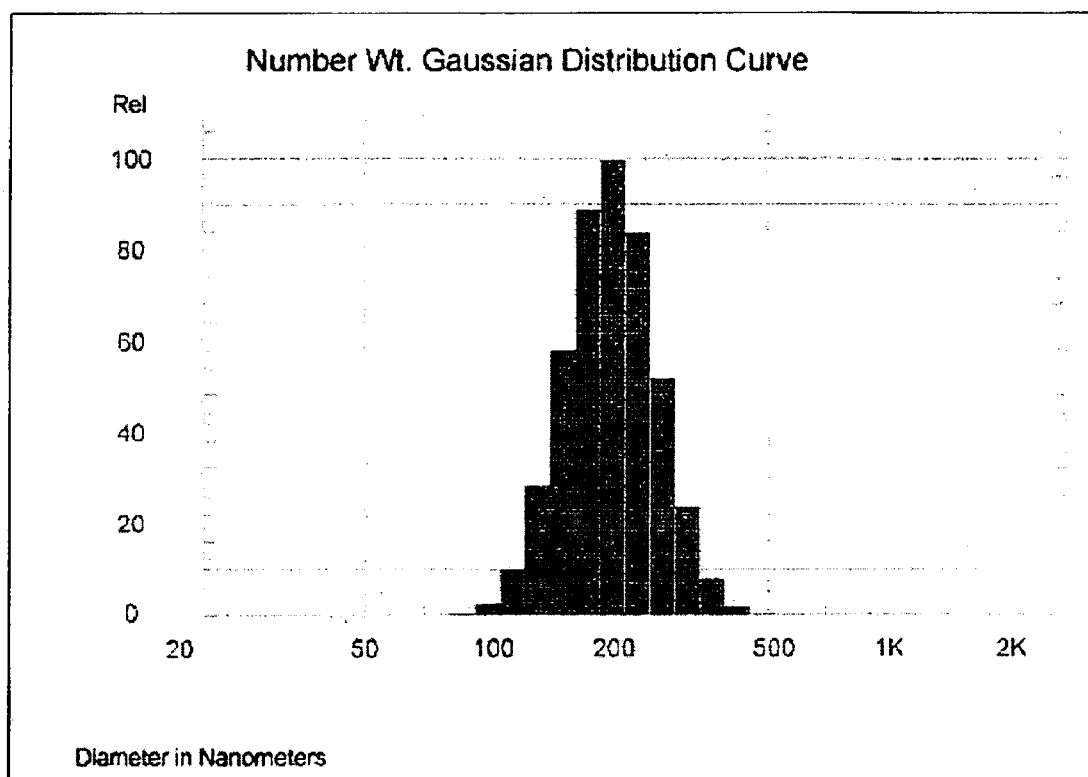
FIG. 10 is a distribution curve of the number average diameter of composite particles shown in FIG. 9.
Figure 11:
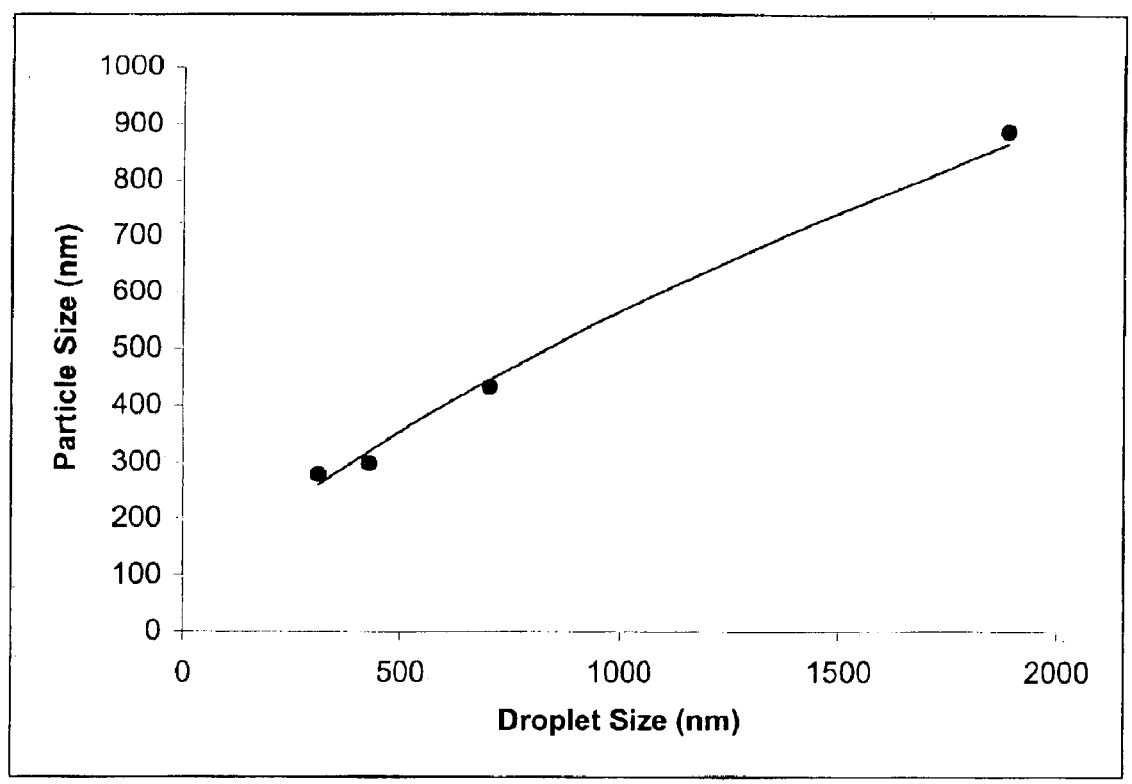
FIG. 11 is a graph showing the relationship of emulsion droplet size versus composite particle size of the particles shown in FIG. 9.
Figure 12:
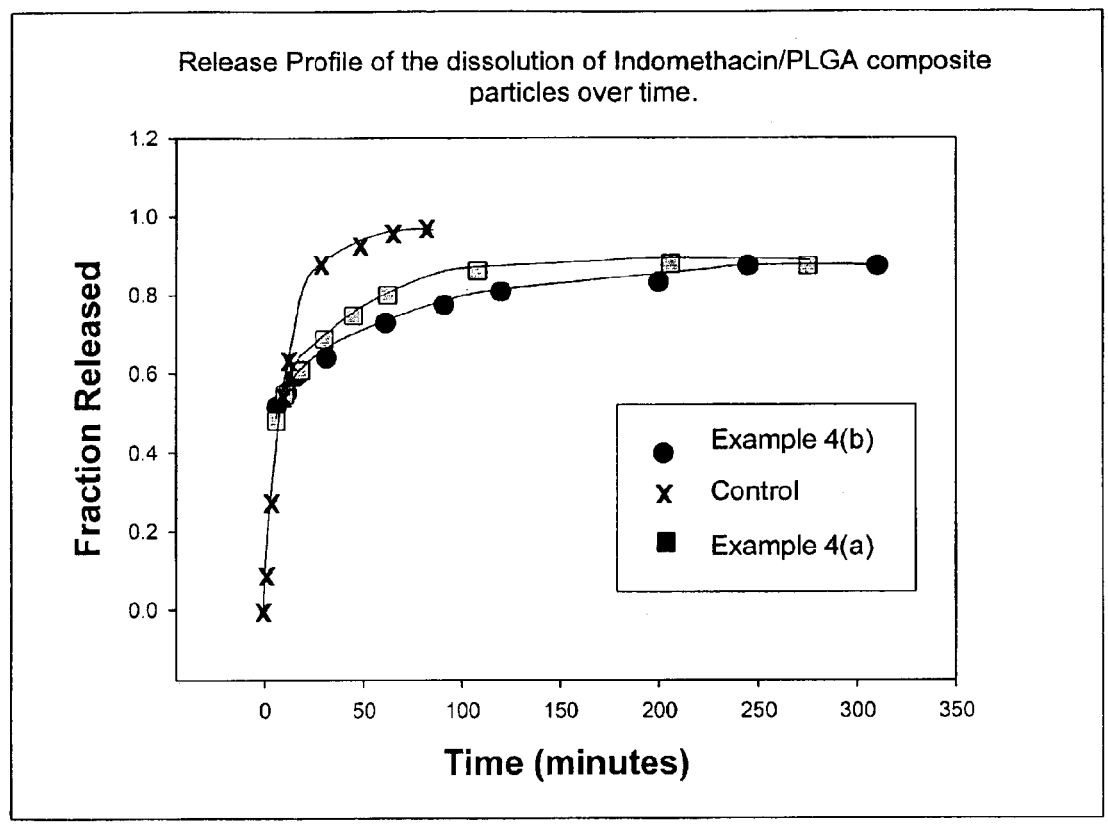
FIG. 12 is a graph of the release profile of the composite particles produced in EXAMPLES 4(a) and 4(b) relative to a control.

After the PLGA/IN composite particles were dried, SEM micrographs showed that the PLGA/IN composite particles were mono-dispersed spherical-shaped particles having a mean volume size of 188 nm. FIG. 9 is an SEM micrograph of the composite particles obtained in EXAMPLE 4(a). Number average sizes of the PLGA/IN composite particles obtained from each of the EMULSIONS 4(a)–4(d) have been shown in TABLE 2. FIG. 10 is a number size distribution curve of the PLGA/IN composite particles produced in EXAMPLE 4. As illustrated in FIG. 11 and TABLE 2 there is an increase in particle size with an increase in emulsion droplet size. FIG. 12 is a graph showing the release profile over time of the composite particles produced in EXAMPLES 4(a)–4(b) relative to a pure Indomethacin control.

TABLE 2

Particle size with reference to emulsion droplet size for PLGA/IN composite nanoparticles.

| EXAMPLE | Droplet size (nm) | Particle size (nm) | Std. Dev. Particle size (nm) |
| --- | --- | --- | --- |
| 4(a) | 312 | 279 | 73 |
| 4(b) | 428 | 299 | 103 |
| 4(c) | 703 | 434 | 254 |
| 4(d) | 1887 | 886 | 537 |

The processes and embodiments described herein are examples of structures, systems and methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems and methods that do not differ from the literal language of the claims, and further includes other structures, systems and methods with insubstantial differences from the literal language of the claims.

What is claimed is:

1. A method for producing composite particles, comprising:

contacting an emulsion with a supercritical fluid, the emulsion comprising a continuous phase of a polar liquid and a discontinuous non-aqueous phase in the form of a plurality of droplets, the droplets comprising a solution of an organic solvent having a first material dissolved therein and a second material dissolved or suspended therein, the first material being generally insoluble in the polar liquid, and the organic solvent being soluble in the supercritical fluid;

extracting the organic solvent from the droplets using the supercritical fluid while the supercritical fluid is maintained as a supercritical phase to thereby precipitate composite particles into the polar liquid to form a suspension, the composite particles comprising the first material and the second material; and recovering the suspension of the composite particles precipitated into the polar liquid.

2. The method as defined in claim 1 wherein the first material is a polymer and the second material is a biologically active material that is soluble in the organic solvent, and the composite particles consist essentially of the biologically active material dispersed in a matrix of the polymer.

3. The method as defined in claim 2 wherein the biologically active material is a pharmaceutically active material and the polymer is a biodegradable polymer, and the biologically active material is entrained or encapsulated in the polymer matrix, whereby the composite particles respond to uptake of the composite particles by a person by the polymer biodegrading and releasing the pharmaceutically active material from the polymer matrix into the person in a time-delayed manner or at a site-specific location in the person.

4. The method as defined in claim 2 wherein the biologically active material and the polymer are generally water-insoluble, and the continuous phase is an aqueous phase, whereby the first and the second materials precipitate as generally water insoluble composite particles in an aqueous phase to form an aqueous suspension of composite particles.

5. The method as defined in claim 1 wherein at least one of the first and second materials is selected from the group consisting of therapeutic agent, steroid, drug, medicinal agent, nutritional material, protein, peptide, alkaloid, alkyloid, animal and/or plant extract, nutriceutical, antigen, nucleic acid or other genetic sequence, viral material, antibiotic, sugar, vitamin, lipid, polymer, polymer precursor, toxin, insecticide, diagnostic aid, agricultural chemical, dye, pigment, paint, metal oxide, cosmetic, explosive, enzyme, and catalyst.

6. The method as defined in claim 2 wherein the second material comprises a plurality of differing biologically active materials, the method further comprising the step of selecting each of the biologically active materials with reference to each other to create an enhanced or synergistic therapeutic effect after uptake of the composite particles by a person.

7. The method as defined in claim 1 further comprising the step of forming the emulsion using a microfluidizer, an ultrasonic horn, a dispersator, a static mixer, a colloid mill, a fluid energy mill, a turbine mixer, or a spontaneous emulsification technique.

8. The method as defined in claim 1 further comprising the step of selecting a concentration of the droplets in the continuous phase of the emulsion to obtain a desired composite particle size, wherein an increase in the concentration of the of the droplets results in an increase in the composite particle size, and a decrease the concentration of the of the droplets results in a decrease in the composite particle size.

9. The method as defined in claim 1 wherein the contacting step is accomplished by spraying the emulsion in the form of spray-drops into the supercritical fluid, wherein the composite particles are precipitated and suspended in the continuous phase in the emulsion spray-drops after the step of contacting the emulsion with the supercritical fluid.

10. The method as defined in claim 9 further comprising the step of selecting a size of the emulsion spray-drops to obtain a desired composite particle size, wherein an increase in the emulsion spray-drops size results in an increase in the composite particles size, and a decrease the emulsion spray-drops size results in a decrease in the composite particles size.

11. The method as defined in claim 9 wherein the emulsion is injected through a nozzle such that the emulsion is sprayed into a volume of the supercritical fluid to form the emulsion spray-drops, and the nozzle is a capillary nozzle, a coaxial nozzle or an ultrasonic nozzle.

12. The method defined in claim 9 wherein the step of contacting further comprises operating a mixer to increase the contact area between the emulsion spray-drops and the supercritical fluid, the mixer being a vibrating surface or a propeller mixer or a static mixer, and thereby increasing a mass transfer rate of the solvent from the emulsion droplets to the supercritical fluid.

13. The method as defined in claim 1 further comprising the step of selecting a size of the droplets in the continuous phase of the emulsion to obtain a desired size of the composite particles, wherein an increase in the droplets size results in an increase in the composite particles size, and a decrease the droplets size results in a decrease in the composite particles size.

14. The method as defined in claim 1, further comprising the step of filtering the suspension of the composite particles precipitated into the polar liquid through a high-pressure filter to form a concentrated suspension or cake containing the composite particles, wherein the concentrated suspension or cake is suitable for drying.

15. The method as defined in claim 1 further comprising the step of selecting a concentration of the first material in the solution to obtain a desired composite particles size, wherein an increase in the first material concentration results in an increase in the composite particles size, and a decrease the first material concentration results in a decrease in the composite particles size.

16. The method as defined in claim 1 wherein the second material is encapsulated in the first material in the composite particles, or the second material is dispersed throughout the first material in the composite particles, the second material being a biologically active material and the first material being a biodegradable polymer.

17. The method as defined in claim 1 wherein the step of contacting comprises bubbling the supercritical fluid through the emulsion.

18. The method as defined in claim 1 wherein the composite particles have an average diameter in a range of from about 0.1 nanometers to about 10.0 microns.

19. The method as defined in claim 1 wherein the solution comprises a mixture of organic co-solvents that are miscible with one another, and at least one of the organic co-solvents aids in the dissolution of at least one of the first and second materials.

20. The method as defined in claim 1 wherein the organic solvent in the solution is partially soluble in water or the solution comprises a mixture of partially water-soluble organic solvents.

21. The method as defined in claim 1 wherein the supercritical fluid also extracts a portion of the polar liquid from the emulsion.

22. The method as defined in claim 1 wherein the emulsion further comprises a surfactant to that stabilizes the emulsion before the step of contacting the emulsion with the supercritical fluid or prevents the growth of composite particles after the step of contacting the emulsion with the supercritical fluid.

23. The method as defined in claim 1 wherein the supercritical fluid comprises carbon dioxide.

24. The method as defined in claim 1 wherein the composite particles are produced in a continuous operation.

25. The method as defined in claim 24 further comprising the step of forming the emulsion, wherein the emulsion is formed in a continuous manner and directed into an extraction chamber after formation of the emulsion.

26. A method for producing composite particles, comprising:
   contacting a-water-in-oil-in-water (W/O/W) emulsion with a supercritical fluid, wherein the W/O/W emulsion comprises a continuous aqueous phase and a discontinuous phase in the form of a plurality of droplets, wherein the droplets comprise an organic solvent having an aqueous solution emulsified therein in the form of microdroplets, wherein a first material that is generally insoluble in the aqueous phase of the W/O/W emulsion is dissolved or suspended in the organic solvent and a second material is dissolved or suspended in the aqueous solution in the microdroplets; and
   extracting the organic solvent from the droplets of the W/O/W emulsion using the supercritical fluid while the supercritical fluid is maintained as a supercritical phase to thereby precipitate composite particles into the polar liquid to form a suspension, the composite particles comprising the first material and the second material.

27. The method as defined in claim 26 wherein the composite particles each have a matrix formed by the first material, and the second material is dispersed in the matrix.

28. A method for producing composite particles, comprising:
   contacting an emulsion with a supercritical fluid, the emulsion comprising a continuous phase of a first polar liquid and a discontinuous phase in the form of a plurality of droplets, the droplets comprising an organic solvent having a second polar liquid emulsified therein in the form of microdroplets, wherein a first material is dissolved in the organic solvent and a second material is dissolved or suspended in the second polar liquid; and
   extracting the organic solvent from the emulsion using the supercritical fluid while the supercritical fluid is maintained as a supercritical phase to thereby precipitate composite particles into the first polar liquid, the composite particles comprising a matrix of the first material having the second material dispersed therein.

29. The method as defined in claim 28 wherein the first material is a polymer and the second material is a biologically active material, and the composite particles consist essentially of the biologically active material dispersed in a matrix formed of the polymer.

30. The method as defined in claim 29 wherein the biologically active material is a pharmaceutically active material and the polymer is a biodegradable polymer, and the biologically active material is entrained or encapsulated in the polymer matrix, whereby the composite particles respond to uptake of the composite particles by a person by the polymer biodegrading and releasing the pharmaceutically active material from the polymer matrix into the person in a time-delayed manner or at a site-specific location in the person.

31. The method as defined in claim 29 wherein the biologically active material and the polymer are both generally water-insoluble, and the continuous phase of the emulsion is an aqueous phase, whereby the first and the second materials precipitate as generally water insoluble composite particles in an aqueous phase to form an aqueous suspension of water insoluble composite particles.

32. The method as defined in claim 28 wherein at least one of the first and second materials is selected from the group consisting of therapeutic agent, steroid, drug, medicinal agent, nutritional material, protein, peptide, alkaloid, alkyloid, animal and/or plant extract, nutriceutical, antigen, nucleic acid or other genetic sequence, viral material, antibiotic, sugar, vitamin, lipid, polymer, polymer precursor, toxin, insecticide, diagnostic aid, agricultural chemical, dye, pigment, paint, metal oxide, cosmetic, explosive, enzyme, and catalyst.

33. The method as defined in claim 32 wherein the second material comprises a plurality of differing biologically active materials, the method further comprising the step of selecting each of the biologically active materials with reference to each other to create an enhanced or synergistic therapeutic effect after uptake of the composite particles by a person.

34. The method as defined in claim 28 further comprising the step of forming the emulsion using a microfluidizer, an ultrasonic horn, a dispersator, a static mixer, a colloid mill, a fluid energy mill, a turbine mixer, or a spontaneous emulsification technique.

35. The method as defined in claim 28 further comprising the step of selecting a concentration of the droplets in the continuous phase to obtain a desired composite particle size, wherein an increase in the concentration of the of the droplets results in an increase in the composite particle size, and a decrease the concentration of the of the droplets results in a decrease in the composite particle size.

36. The method as defined in claim 28 wherein the emulsion is contacted with the supercritical fluid by spraying the emulsion into the supercritical fluid in the form of spray-drops.

37. The method as defined in claim 36 further comprising the step of selecting a size of the emulsion spray-drops to obtain a desired composite particle size, wherein an increase in the emulsion spray-drops size results in an increase in the composite particles size, and a decrease the emulsion spray-drops size results in a decrease in the composite particles size.

38. The method as defined in claim 36 wherein the emulsion is injected through a nozzle such that the emulsion is sprayed into a volume of the supercritical fluid to form the emulsion spray-drops, and the nozzle is a capillary nozzle, a coaxial nozzle or an ultrasonic nozzle.

39. The method defined in claim 36 further comprising mixing the emulsion spray-drops and the supercritical fluid together using a mixer, the mixer being a vibrating surface or a propeller mixer or a static mixer, and thereby increasing a mass transfer rate of the organic solvent from the emulsion spray-drops to the supercritical fluid.

40. The method as defined in claim 28 further comprising the step of selecting a size of the droplets dispersed in the continuous phase of the emulsion to obtain a desired size of the composite particles, wherein an increase in the droplets size results in an increase in the composite particles size, and a decrease the droplets size results in a decrease in the composite particles size.

41. The method as defined in claim 28 further comprising the step of selecting a concentration of the first material dissolved in the organic solvent to obtain a desired composite particles size, wherein an increase in the first material concentration results in an increase in the composite particles size, and a decrease the first material concentration results in a decrease the composite particles size.

42. The method as defined in claim 28 wherein the second material is encapsulated in the first material in the composite particles or the second material is dispersed throughout the first material in the composite particles, and wherein the second material comprises a biologically active material and the first material comprises a biodegradable polymer.

43. The method as defined in claim 28 wherein the step of contacting comprises bubbling the supercritical fluid through the emulsion.

44. The method as defined in claim 28 wherein the composite particles have an average diameter in a range of from about 0.1 nanometers to about 10.0 microns.

45. The method as defined in claim 28 wherein the droplets comprise a mixture of organic co-solvents that are miscible with one another, and at least one of the organic co-solvents aids in the dissolution of the first material.

46. The method as defined in claim 28 wherein the organic solvent is partially soluble in water or the organic solvent comprises a mixture of partially water-soluble organic solvents.

47. The method as defined in claim 28 wherein the supercritical fluid also extracts a portion of the polar liquid from the emulsion.

48. The method as defined in claim 28 wherein the emulsion further comprises a surfactant that stabilizes the emulsion before the step of contacting the emulsion with the supercritical fluid or prevents the growth of composite particles after the step of contacting the emulsion with the supercritical fluid.

49. The method as defined in claim 28 wherein the supercritical fluid comprises carbon dioxide.

50. The method as defined in claim 28 wherein the composite particles are produced in a continuous operation.

51. The method as defined in claim 28 wherein the emulsion is formed in a continuous manner and is directed into an extraction chamber immediately after formation of the emulsion.

* * * * *